(12) United States Patent
Trescott (10) Patent No.: US 9,371,632 B2
(45) Date of Patent: Jun. 21, 2016

(54) NON-INVASIVE THERMAL DISPERSION FLOW METER WITH CHRONOMETRIC MONITOR FOR FLUID LEAK DETECTION

(71) Applicant: Robert Trescott, San Diego, CA (US)

(72) Inventor: Robert Trescott, San Diego, CA (US)

(73) Assignee: Sentinel Hydrosolutions, LLC, Escondido, CA (US)

( * ) Notice: Subject to any disclaimer, the term of this patent is extended or adjusted under 35 U.S.C. 154(b) by 0 days.

(21) Appl. No.: 14/868,103

(22) Filed: Sep. 28, 2015

(65) Prior Publication Data

US 2016/0090717 A1 Mar. 31, 2016

Related U.S. Application Data (63) Continuation of application No. 13/342,961, filed on Jan. 3, 2012, now Pat. No. 9,146,172.

(60) Provisional application No. 61/429,242, filed on Jan. 3, 2011, provisional application No. 61/542,793, filed on Oct. 3, 2011.

(51) Int. Cl.
*F16K 31/02* (2006.01)
*F16K 37/00* (2006.01)
*E03B 7/00* (2006.01)
*G01M 3/00* (2006.01)
*E03B 7/07* (2006.01)

(52) U.S. Cl.
CPC ............... *E03B 7/003* (2013.01); *E03B 7/072* (2013.01); *G01M 3/002* (2013.01)

(58) Field of Classification Search
CPC ........ E03B 7/003; E03B 7/072; G01M 3/002; G01F 1/69; G01F 1/696; G01F 1/698; G01P 5/12; Y10T 137/7759; Y10T 137/7761

USPC ............... 137/486, 487.5; 73/204.11, 204.23, 73/204.25, 204.26, 204.15, 204.16, 861.95
See application file for complete search history.

(56) References Cited

U.S. PATENT DOCUMENTS

| | | | | |
|---|---|---|---|---|
| 3,191,119 A | * | 6/1965 | Singer | G01F 1/716 324/306 |
| 3,196,679 A | * | 7/1965 | Howland | G01F 1/68 116/264 |
| 3,807,228 A | * | 4/1974 | Matzuk | G01F 1/7044 73/861.95 |
| 3,874,222 A | | 4/1975 | Ladd et al. | |
| 4,036,053 A | | 7/1977 | Jenkins | |
| 4,135,396 A | * | 1/1979 | Stanke | G01F 1/696 73/204.19 |
| 4,180,088 A | | 12/1979 | Mallett | |
| 4,228,815 A | * | 10/1980 | Juffa | G01F 1/7044 137/10 |
| 4,335,605 A | | 6/1982 | Boyd | |

(Continued)

*Primary Examiner* — John K Fristoe, Jr.
*Assistant Examiner* — Minh Le
(74) *Attorney, Agent, or Firm* — Gary L. Eastman, Esq.

(57) ABSTRACT

A non-invasive thermal dispersion flow meter with chronometric monitor for fluid leak detection includes a heater, an ambient temperature sensor and a flow rate sensor which are configured to sense the temperature of a fluid in a conduit, and then monitor the flow of that fluid through the conduit. The fluid flow sensor is incorporated into a Wheatstone bridge circuit which is used to provide increased sensitivity to the outputs of the sensors. Based upon the ambient temperature sensor readings, the flow rate sensor and heater may be adjusted to optimize the operation of the system to detect leaks. An alternative embodiment utilizes a single sensor and separate heater which work together to determine heat propagation times which in turn is used to calculate flow rate.

14 Claims, 12 Drawing Sheets

(56) References Cited

U.S. PATENT DOCUMENTS

| | | | |
|---|---|---|---|
| 4,336,708 A | 6/1982 | Hobgood et al. | |
| 4,448,545 A * | 5/1984 | Pelka | G01N 25/4893 |
| | | | 374/41 |
| 4,458,709 A * | 7/1984 | Springer | G01F 1/7044 |
| | | | 137/10 |
| 4,518,955 A | 5/1985 | Meyer | |
| 4,529,974 A | 7/1985 | Tanaka et al. | |
| 4,589,435 A | 5/1986 | Aldrich | |
| 4,911,200 A | 3/1990 | Ben-Arie | |
| 4,926,901 A | 5/1990 | Waltenburg | |
| 5,000,224 A | 3/1991 | Olson, Jr. et al. | |
| 5,004,014 A | 4/1991 | Bender | |
| 5,056,554 A | 10/1991 | White | |
| 5,090,436 A | 2/1992 | Hoch, Jr. et al. | |
| 5,228,329 A | 7/1993 | Dennison | |
| 5,267,587 A | 12/1993 | Brown | |
| 5,637,789 A | 6/1997 | Lawson | |
| 5,741,968 A * | 4/1998 | Arai | G01F 1/6888 |
| | | | 73/204.22 |
| 5,764,539 A | 6/1998 | Rani | |
| 5,771,920 A | 6/1998 | Jewett et al. | |
| 5,794,653 A | 8/1998 | Desmet et al. | |
| 5,966,076 A | 10/1999 | Cantrell et al. | |
| 6,147,613 A | 11/2000 | Doumit et al. | |
| 6,310,555 B1 | 10/2001 | Stern et al. | |
| 6,374,846 B1 | 4/2002 | Desmet et al. | |
| 6,481,265 B1 | 11/2002 | Weber et al. | |
| 6,696,961 B2 | 2/2004 | Uhler et al. | |
| 6,804,990 B2 | 10/2004 | Weber et al. | |
| 6,860,288 B2 | 3/2005 | Uhler et al. | |
| 7,054,767 B2 | 5/2006 | Eldrige | |
| 7,270,015 B1 * | 9/2007 | Feller | G01F 1/7044 |
| | | | 600/547 |
| 7,677,097 B2 * | 3/2010 | Tokuyasu | G01F 1/688 |
| | | | 204/424 |
| 2004/0225458 A1 | 11/2004 | Sherikar | |
| 2008/0295590 A1 * | 12/2008 | Sukegawa | G01F 1/688 |
| | | | 73/204.26 |
| 2012/0210781 A1 * | 8/2012 | Klee | G01F 1/688 |
| | | | 73/204.23 |
| 2015/0144543 A1 * | 5/2015 | Kondo | G01F 1/684 |
| | | | 210/137 |

* cited by examiner

Direct Pipe "Clamp-On" Flow Meter Leak Detector - Warm Test Data Points

| Time | No Flow | Low Flow | Med Flow | Heater | Time | No Flow | Low Flow | Med Flow | Heater |
|---|---|---|---|---|---|---|---|---|---|
| 1 | 75.86 | 75.80 | 75.57 | 75.00 | 51 | 80.92 | 78.27 | 76.31 | 75.00 |
| 2 | 75.91 | 75.80 | 75.57 | 75.00 | 52 | 80.92 | 78.16 | 76.25 | 75.00 |
| 3 | 75.91 | 75.74 | 75.57 | 75.00 | 53 | 80.81 | 78.05 | 76.25 | 75.00 |
| 4 | 75.91 | 75.80 | 75.63 | 75.00 | 54 | 80.69 | 77.99 | 76.25 | 75.00 |
| 5 | 75.91 | 75.80 | 75.63 | 75.00 | 55 | 80.64 | 77.94 | 76.19 | 75.00 |
| 6 | 75.86 | 75.80 | 75.63 | 75.00 | 56 | 80.52 | 77.82 | 76.14 | 75.00 |
| 7 | 75.91 | 75.80 | 75.57 | 75.00 | 57 | 80.47 | 77.77 | 76.14 | 75.00 |
| 8 | 75.97 | 75.80 | 75.57 | 81.67 | 58 | 80.36 | 77.71 | 76.08 | 75.00 |
| 9 | 75.91 | 75.74 | 75.57 | 81.67 | 59 | 80.30 | 77.66 | 76.08 | 75.00 |
| 10 | 75.91 | 75.80 | 75.57 | 81.67 | 60 | 80.24 | 77.54 | 76.08 | 75.00 |
| 11 | 75.97 | 75.86 | 75.63 | 81.67 | 61 | 80.13 | 77.49 | 76.02 | 75.00 |
| 12 | 76.08 | 75.97 | 75.74 | 81.67 | 62 | 80.02 | 77.43 | 76.02 | 75.00 |
| 13 | 76.19 | 76.08 | 75.80 | 81.67 | 63 | 79.96 | 77.32 | 76.02 | 75.00 |
| 14 | 76.36 | 76.25 | 75.91 | 81.67 | 64 | 79.91 | 77.32 | 75.97 | 75.00 |
| 15 | 76.53 | 76.42 | 76.02 | 81.67 | 65 | 79.85 | 77.26 | 75.97 | 75.00 |
| 16 | 76.76 | 76.59 | 76.08 | 81.67 | 66 | 79.79 | 77.21 | 75.97 | 75.00 |
| 17 | 76.92 | 76.76 | 76.25 | 81.67 | 67 | 79.68 | 77.15 | 75.97 | 75.00 |
| 18 | 77.15 | 76.92 | 76.42 | 81.67 | 68 | 79.57 | 77.09 | 75.97 | 75.00 |
| 19 | 77.37 | 77.15 | 76.53 | 81.67 | 69 | 79.57 | 77.04 | 75.91 | 75.00 |
| 20 | 77.66 | 77.32 | 76.64 | 81.67 | 70 | 79.46 | 76.98 | 75.86 | 75.00 |
| 21 | 77.88 | 77.49 | 76.70 | 81.67 | 71 | 79.46 | 76.92 | 75.91 | 75.00 |
| 22 | 78.11 | 77.71 | 76.81 | 81.67 | 72 | 79.34 | 76.92 | 75.86 | 75.00 |
| 23 | 78.39 | 77.88 | 76.92 | 81.67 | 73 | 79.29 | 76.87 | 75.86 | 75.00 |
| 24 | 78.67 | 78.11 | 76.98 | 81.67 | 74 | 79.23 | 76.87 | 75.91 | 75.00 |
| 25 | 78.95 | 78.27 | 77.04 | 81.67 | 75 | 79.17 | 76.81 | 75.86 | 75.00 |
| 26 | 79.23 | 78.44 | 77.15 | 81.67 | 76 | 79.17 | 76.76 | 75.86 | 75.00 |
| 27 | 79.51 | 78.61 | 77.21 | 81.67 | 77 | 79.06 | 76.70 | 75.86 | 75.00 |
| 28 | 79.85 | 78.78 | 77.26 | 81.67 | 78 | 79.01 | 76.64 | 75.86 | 75.00 |
| 29 | 80.07 | 78.95 | 77.32 | 75.00 | 79 | 78.95 | 76.64 | 75.86 | 75.00 |
| 30 | 80.41 | 79.12 | 77.37 | 75.00 | 80 | 78.89 | 76.59 | 75.80 | 75.00 |
| 31 | 80.69 | 79.23 | 77.43 | 75.00 | 81 | 78.89 | 76.59 | 75.80 | 75.00 |
| 32 | 80.97 | 79.40 | 77.43 | 75.00 | 82 | 78.84 | 76.59 | 75.80 | 75.00 |
| 33 | 81.14 | 79.46 | 77.43 | 75.00 | 83 | 78.78 | 76.53 | 75.80 | 75.00 |
| 34 | 81.37 | 79.51 | 77.43 | 75.00 | 84 | 78.72 | 76.47 | 75.80 | 75.00 |
| 35 | 81.48 | 79.57 | 77.32 | 75.00 | 85 | 78.72 | 76.42 | 75.80 | 75.00 |
| 36 | 81.59 | 79.51 | 77.32 | 75.00 | 86 | 78.67 | 76.47 | 75.80 | 75.00 |
| 37 | 81.65 | 79.46 | 77.21 | 75.00 | 87 | 78.61 | 76.47 | 75.80 | 75.00 |
| 38 | 81.65 | 79.40 | 77.21 | 75.00 | 88 | 78.56 | 76.42 | 75.80 | 75.00 |
| 39 | 81.71 | 79.34 | 77.04 | 75.00 | 89 | 78.56 | 76.36 | 75.80 | 75.00 |
| 40 | 81.71 | 79.29 | 76.98 | 75.00 | 90 | 78.50 | 76.36 | 75.80 | 75.00 |
| 41 | 81.65 | 79.17 | 76.92 | 75.00 | OHEAT (deg) | 4 | | | |
| 42 | 81.65 | 79.12 | 76.87 | 75.00 | HEAT time (sec) | 21 | 21 | 21 | |
| 43 | 81.59 | 79.01 | 76.76 | 75.00 | Peak temp (deg) | 81.71 | 79.57 | 77.43 | |
| 44 | 81.54 | 78.89 | 76.70 | 75.00 | Peak temp delta | 5.85 | 3.77 | 1.86 | |
| 45 | 81.48 | 78.84 | 76.64 | 75.00 | Max temp time | 10 | 6 | 2 | |
| 46 | 81.42 | 78.72 | 76.59 | 75.00 | FinTemp | 4.38 | 1.74 | 0.51 | |
| 47 | 81.31 | 78.61 | 76.53 | 75.00 | Score | 49.65 | 14.21 | 2.88 | |
| 48 | 81.26 | 78.56 | 76.47 | 75.00 | MinTemp | 75.86 | | | |
| 49 | 81.14 | 78.44 | 76.42 | 75.00 | SpanTemp | 5.85 | | | |
| 50 | 81.03 | 78.33 | 76.36 | 75.00 | | | | | |

Direct Pipe "Clamp-On" Flow Meter Leak Detector - Cold Test Data Points

| Time | No Flow | Low Flow | Med Flow | Heater | Time | No Flow | Low Flow | Med Flow | Heater |
|---|---|---|---|---|---|---|---|---|---|
| 1 | 38.00 | 38.06 | 38.06 | 37.50 | 51 | 42.67 | 40.47 | 38.79 | 37.50 |
| 2 | 37.94 | 38.06 | 38.06 | 37.50 | 52 | 42.67 | 40.36 | 38.79 | 37.50 |
| 3 | 38.00 | 38.06 | 38.06 | 37.50 | 53 | 42.61 | 40.25 | 38.73 | 37.50 |
| 4 | 37.94 | 38.11 | 38.06 | 37.50 | 54 | 42.56 | 40.19 | 38.67 | 37.50 |
| 5 | 38.00 | 38.06 | 38.11 | 37.50 | 55 | 42.56 | 40.14 | 38.67 | 37.50 |
| 6 | 37.94 | 38.06 | 38.06 | 37.50 | 56 | 42.50 | 40.08 | 38.62 | 37.50 |
| 7 | 38.00 | 38.06 | 38.06 | 43.38 | 57 | 42.44 | 39.97 | 38.62 | 37.50 |
| 8 | 38.00 | 38.06 | 38.06 | 43.38 | 58 | 42.39 | 39.91 | 38.56 | 37.50 |
| 9 | 37.94 | 38.11 | 38.11 | 43.38 | 59 | 42.39 | 39.86 | 38.56 | 37.50 |
| 10 | 38.00 | 38.06 | 38.11 | 43.38 | 60 | 42.33 | 39.80 | 38.51 | 37.50 |
| 11 | 38.06 | 38.11 | 38.11 | 43.38 | 61 | 42.27 | 39.74 | 38.51 | 37.50 |
| 12 | 38.17 | 38.22 | 38.17 | 43.38 | 62 | 42.22 | 39.69 | 38.51 | 37.50 |
| 13 | 38.28 | 38.34 | 38.28 | 43.38 | 63 | 42.16 | 39.63 | 38.45 | 37.50 |
| 14 | 38.39 | 38.39 | 38.39 | 43.38 | 64 | 42.16 | 39.57 | 38.45 | 37.50 |
| 15 | 38.56 | 38.56 | 38.51 | 43.38 | 65 | 42.11 | 39.52 | 38.39 | 37.50 |
| 16 | 38.79 | 38.79 | 38.62 | 43.38 | 66 | 42.11 | 39.46 | 38.39 | 37.50 |
| 17 | 39.01 | 38.90 | 38.73 | 43.38 | 67 | 41.99 | 39.41 | 38.39 | 37.50 |
| 18 | 39.24 | 39.07 | 38.84 | 43.38 | 68 | 41.94 | 39.41 | 38.39 | 37.50 |
| 19 | 39.41 | 39.29 | 38.96 | 43.38 | 69 | 41.88 | 39.35 | 38.39 | 37.50 |
| 20 | 39.69 | 39.46 | 39.07 | 43.38 | 70 | 41.88 | 39.24 | 38.34 | 37.50 |
| 21 | 39.86 | 39.63 | 39.12 | 43.38 | 71 | 41.82 | 39.24 | 38.34 | 37.50 |
| 22 | 40.08 | 39.80 | 39.24 | 43.38 | 72 | 41.77 | 39.24 | 38.34 | 37.50 |
| 23 | 40.36 | 39.97 | 39.35 | 43.38 | 73 | 41.77 | 39.18 | 38.34 | 37.50 |
| 24 | 40.59 | 40.08 | 39.46 | 43.38 | 74 | 41.71 | 39.12 | 38.28 | 37.50 |
| 25 | 40.81 | 40.31 | 39.52 | 43.38 | 75 | 41.71 | 39.07 | 38.28 | 37.50 |
| 26 | 41.09 | 40.47 | 39.57 | 43.38 | 76 | 41.66 | 39.01 | 38.22 | 37.50 |
| 27 | 41.21 | 40.64 | 39.63 | 43.38 | 77 | 41.60 | 39.01 | 38.28 | 37.50 |
| 28 | 41.54 | 40.76 | 39.74 | 43.38 | 78 | 41.60 | 39.01 | 38.22 | 37.50 |
| 29 | 41.77 | 40.98 | 39.80 | 37.50 | 79 | 41.54 | 38.96 | 38.22 | 37.50 |
| 30 | 42.05 | 41.09 | 39.86 | 37.50 | 80 | 41.49 | 38.90 | 38.22 | 37.50 |
| 31 | 42.22 | 41.26 | 39.91 | 37.50 | 81 | 41.43 | 38.90 | 38.28 | 37.50 |
| 32 | 42.39 | 41.32 | 39.91 | 37.50 | 82 | 41.43 | 38.84 | 38.22 | 37.50 |
| 33 | 42.61 | 41.37 | 39.97 | 37.50 | 83 | 41.43 | 38.79 | 38.22 | 37.50 |
| 34 | 42.67 | 41.49 | 39.86 | 37.50 | 84 | 41.37 | 38.79 | 38.22 | 37.50 |
| 35 | 42.84 | 41.49 | 39.86 | 37.50 | 85 | 41.32 | 38.79 | 38.22 | 37.50 |
| 36 | 42.89 | 41.49 | 39.80 | 37.50 | 86 | 41.32 | 38.73 | 38.22 | 37.50 |
| 37 | 43.01 | 41.49 | 39.69 | 37.50 | 87 | 41.26 | 38.73 | 38.22 | 37.50 |
| 38 | 42.95 | 41.43 | 39.63 | 37.50 | 88 | 41.21 | 38.67 | 38.22 | 37.50 |
| 39 | 43.06 | 41.37 | 39.57 | 37.50 | 89 | 41.21 | 38.67 | 38.22 | 37.50 |
| 40 | 43.01 | 41.26 | 39.52 | 37.50 | 90 | 41.15 | 38.67 | 38.17 | 37.50 |
| 41 | 43.01 | 41.21 | 39.41 | 37.50 | OHEAT (deg) | 4 | | | |
| 42 | 43.01 | 41.15 | 39.35 | 37.50 | HEAT time (sec) | 21 | 21 | 21 | |
| 43 | 43.01 | 41.09 | 39.29 | 37.50 | Peak temp (deg) | 43.06 | 41.49 | 39.97 | |
| 44 | 42.95 | 40.98 | 39.24 | 37.50 | Peak temp delta | 5.06 | 3.43 | 1.91 | |
| 45 | 42.95 | 40.92 | 39.12 | 37.50 | Max temp time | 10 | 5 | 4 | |
| 46 | 42.89 | 40.81 | 39.07 | 37.50 | FinTemp | 4.33 | 1.74 | 0.45 | |
| 47 | 42.84 | 40.81 | 39.01 | 37.50 | Score | 48.36 | 12.13 | 3.71 | |
| 48 | 42.84 | 40.70 | 38.96 | 37.50 | MinTemp | 37.94 | | | |
| 49 | 42.78 | 40.59 | 38.96 | 37.50 | SpanTemp | 5.12 | | | |
| 50 | 42.72 | 40.53 | 38.84 | 37.50 | | | | | |

FIGURE 11B

NON-INVASIVE THERMAL DISPERSION FLOW METER WITH CHRONOMETRIC MONITOR FOR FLUID LEAK DETECTION

RELATED APPLICATIONS

The application is a continuation of U.S. Utility patent application Ser. No. 13/342,961, now issued as U.S. Pat. No. 9,146,172, filed Jan. 3, 2012 entitled "Non-Invasive Thermal Dispersion Flow Meter with Chronometric Monitor for Fluid Leak Detection," which claims priority to U.S. Provisional Patent Application Ser. No. 61/429,242 filed Jan. 3, 2011 entitled "Noninvasive Thermal Dispersion Flow Meter with Chronometric Monitor for Fluid Leak Detection," and to U.S. Provisional Patent Application Ser. No. 61/542,793 filed on Oct. 3, 2011 entitled "Direct Pipe Clamp on Flow Meter Leak Detector."

FIELD OF INVENTION

The present invention relates generally to the field of fluid leakage detection. More particularly, the present invention relates to devices useful for the monitoring and evaluation of fluid flow rates. The present invention is more particularly, through not exclusively, useful as a non-invasive leak detection system capable of detecting even the smallest fluid leakage within a fluid conduit system, terminating fluid flow in response to the leak, and providing other indication, alert, and control functions.

BACKGROUND OF THE INVENTION

In the process of residential or commercial building construction, builders will frequently pre-plumb water supply pipes, and then encase the foundation level plumbing within a concrete mixture creating a floor slab. The plumbing will remain in use for the existence of the structure until it fails and leaks. Slab leaks typically start when a pinhole size rupture forms in a pipe or fitting from a period of constant pressure, friction with the slab material, and thermal expansion and contraction. As more water passes through the opening, in time, the size of the rupture increases. Undetected, the escaping water will eventually flood the foundation, damage floors and walls and ultimately undermine the ground beneath the structure due to erosion.

The control of water has challenged man since the beginning. The world today benefits and suffers from the conveyance and containment of this life giving fluid. No matter the culture, the class, or the location, similar issues are considered, such as materials, installation, pressures, maintenance, effects of internal and external conditions, including water quality, climactic conditions, electrolysis, etc. Issues with any one of these may result in undesirable effects and damages.

Leaks can be slow and gradual, taking years to detect until significant property damage occurs, or there can be large leaks that quickly produce a variety of damaging results. Significant costs are expended everyday all over the world from these water-related damages. The costs are so extensive and pervasive, that nearly everyone in our modern world has been personally affected.

Leaks occur at all phases of water system function, both during and after construction. During construction leaks result from improper installation, faulty materials, testing, unintentional trade damage, and vandalism—to name a few. Once a water system is installed, leaks are often a daily occurrence. Costs are spread between responsible parties, insurance companies and often to those not responsible who cannot prove otherwise, or because responsible parties have no ability to pay the frequently large damages. Virtually anyone in the construction industry can tell you horror stories about water damage during their most recent project. Most in the industry accept these damages simply as part of the construction world and never consider there may actually be a solution to eliminate or minimize these damages.

Once a building, home or facility becomes occupied, the risks of leaks may shift, but still remain as a liability, as any insurance underwriter can attest. The repair and refurbishment resulting from leaks is an enormous industry, most recently exacerbated by the scares and realities of mold. Slow, hard to detect leaks within walls, ceilings or concealed areas often result in the most damage, as they introduce moisture into a warm, stable atmosphere of a controlled environment, resulting in mold growth that can cause extensive damage and may include condemnation of the home or building.

Large leaks or ruptures can be catastrophic within a very short amount of time, sometimes within minutes. In commercial structures, leaks can damage computer systems resulting in untold losses of computer data. These risks are not simply limited to property damage, but include personal injury and even death. Toxic mold has verifiably taken a number of lives. Leaks also substantially increase the risk of electrical shock, not to mention medically sensitive risks caused by leaks. Leaks are indiscriminate of time, occurring when occupants are present or away.

Until recently the prevention of leaks and/or mitigation of leak damages have been very limited. The "Loss Prevention" programs of insurance companies have focused primarily on minimizing the underwriting of clients with a history of previous leak claims rather than providing any true measure of "Loss Prevention".

It is known that existing water meters are capable of detecting and reporting water consumption, but these systems, which employ paddle wheels, turbines, or other such impellers, suffer from mechanical limitations which allow for small flow amounts to slip past the meter undetected.

In a preferred embodiment of the present invention, the leak detection system is a water flow monitor and alarm system for detecting water leaking from the pressurized pipes or fixtures in residential and commercial building structures. The sensor probes have no moving parts to wear out and can detect water flow as little as a few ounces of water per hour. If water flows continuously for a preset time without stopping, it triggers an alarm. It may also trigger other functions associated with the system such as a display change and valve control. The alarm function can be set to alert the homeowner or a surveillance company monitoring the premises. Integrated into the system are user guides and features to aid the homeowner or a professional in detecting a leak.

Such an alarm condition could indicate a faulty valve or a more serious condition known as a "slab leak". An undetected slab leak (a broken pipe in or under a concrete slab floor) can cause extreme structural damage in excess of thousands of dollars, and render the property uninsurable from the resulting insurance claim.

In the preferred embodiment, two separate sensor probes are clamped directly onto the outside of a pipe or thermally conductive heat transfer medium between the fluid and the system to allow detection of all flow conditions. Not just water loss under the hot water heater or dishwasher or an icemaker like other point of leak detection competitive devices, but water loss for the entire structure. A comprehensive system may include moisture sensors together with the leak detection system. This will ensure both immediate and long-term protection of the structure and its contents and detect leaks from the pressurized supply side as well as the drain and waste systems, appliances, and water intrusion from the outside environment. Resource conservation and water cost savings are also promoted by detecting unknown water loss long before thousands of gallons escape down the drain or into the structure's foundation.

The preferred embodiment works by measuring the temperature at the upstream and downstream clamps. The downstream clamp contains both a temperature sensor and a heating element. The two temperature sensors form part of the sensing portion of a Wheatstone Bridge where the amount of heat energy added by the heating element to keep the bridge circuit in balance is proportional to the flow rate of fluid in the pipe.

In an alternative embodiment, a single temperature sensor and a separate heating element are clamped onto a pipe. The heating element is located a few inches downstream from the temperature sensor. The sensor and the heating element are both wrapped with insulation thereby isolating the sensor and heating element from ambient conditions and increasing the accuracy of the measurements and the sensitivity of the system. This embodiment works by measuring temperature before the heater is energized, then energizing the heater for a predetermined period of time. The temperature is continuously monitored to determine the amount of time for the heat energy added by the heater to propagate to the temperature sensor. That amount of time is used to determine the flow rate in the pipe. The longer the time for the heat energy to reach the sensor, the higher the flow rate is within the pipe. The shorter the time for the heat energy to reach the sensor, the lower the flow rate is within the pipe. After the propagation time is determined, the heater is deenergized to allow it and the sensor to return to ambient conditions so a new test can be performed.

The control panel is easy to use and attractive. Its display provides real-time system and flow status. The Panel will indicate an alarm condition; the flow level when the alarm occurred, and sound a built-in beeper, then if no action is taken it will activate an industrial quality motor-driven ball valve to shut off the water to the structure. The control panel will then display information to guide the homeowner through the process of detecting simple leaks such as a dripping faucet. The panel can also be used to select other operating modes or select other features of the leak detection system.

When the leak detection system is connected to an auto-dialer telephone device, it can alert anyone with a telephone that a problem exists. When connected to an electric water valve, which is the design for the initial product, it can shut-off the water automatically until the system is manually reset. Other devices may be connected to the leak detection system to coordinate moisture and over-pressure sensors and leak detection throughout the entire structure.

BRIEF DESCRIPTION OF THE FIGURES

The novel features of this invention, as well as the invention itself, both as to its structure and its operation, will be best understood from the accompanying drawings, taken in conjunction with the accompanying description, in which reference characters refer to similar parts, and in which:

FIGS. 10A and 10B consist of a graph and its associated data points respectively. The figures show temperature changes over time for no flow, low flow, and medium flow conditions in response to turning on the heater for a predetermined period of time when the ambient temperature is approximately 75° F.;

FIGS. 11A and 11B consist of a graph with its associated data points which shows temperature changes over time for no flow, low flow, and medium flow conditions in response to turning on the heater for a predetermined period of time when the ambient temperature is approximately 37° F.

DETAILED DESCRIPTION OF A PREFERRED EMBODIMENT

Figure 1:
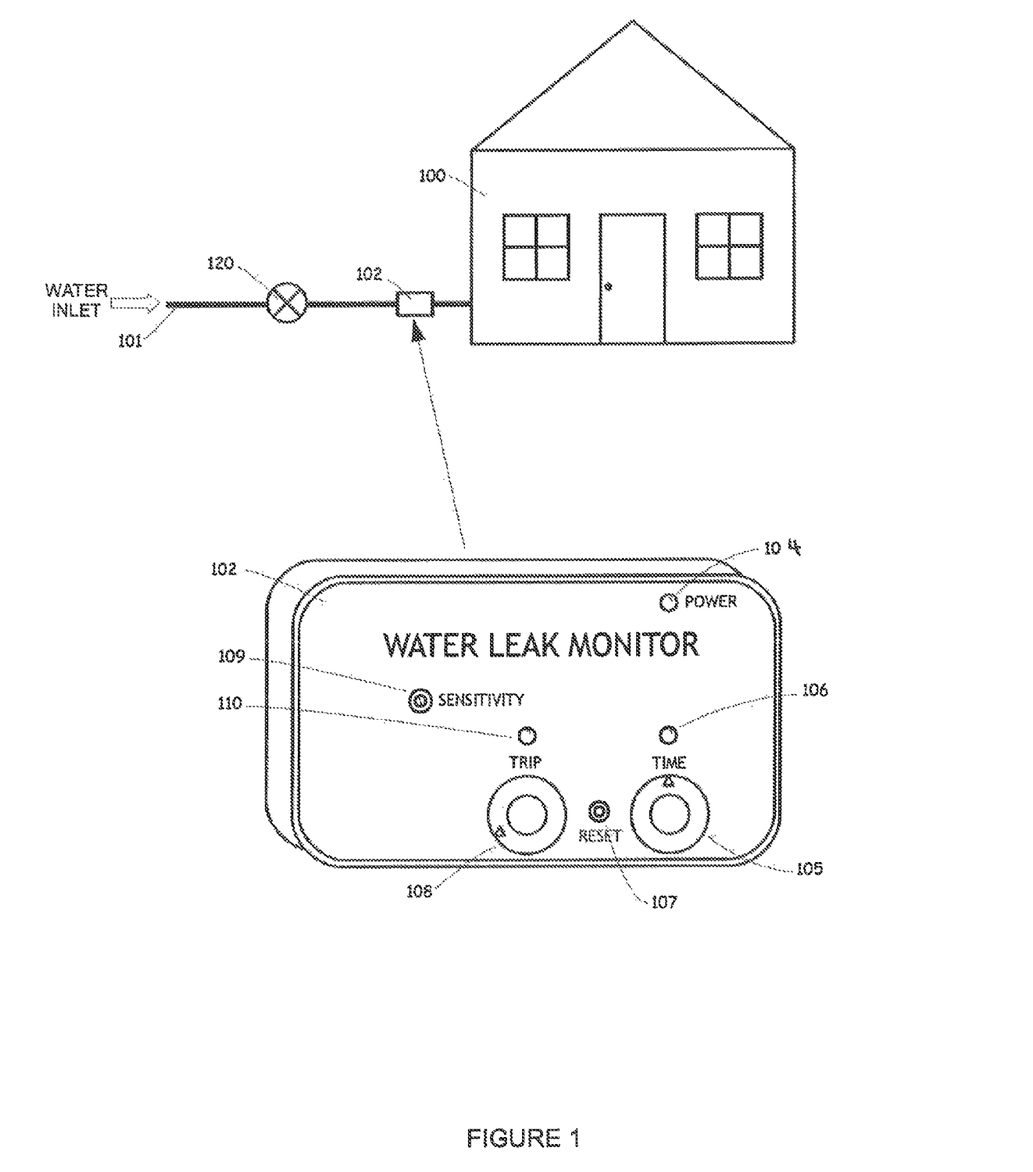
FIG. 1 is an exemplary view of the controller of the present invention as integrated with a structure, and showing the status panel of the system including an alarm indicator, an auxiliary indicator, a flow indicator, and a power indicator.

This invention relates to an electronic thermal monitor system intended to measure fluid flow within a conduit or pipe, by clamping directly to the outside of a pipe or onto a thermally conductive heat transfer medium between the fluid and the system. Referring to FIG. 1, the present invention is suitable for application of leak detection technology into a structure 100 having a water inlet 101, a water leak monitor 102, and a shut off valve 120. The water leak monitor 102 includes a power indicator 104, a timer set 105 with an indicator 106, and a trip level set 108 with an indicator 110. Sensitivity adjustment 109 provides a user the ability to adjust the sensitivity of the device. A reset button 107 is provided to allow for the system to be reset after an alarm condition has been generated.

In an exemplary embodiment, this invention is discussed in conjunction with a typical thin wall copper pipe section commonly found in commercial and residential plumbing systems that form the water supply line. Since copper is an excellent conductor of temperature, this meter infers the water temperature by measuring the outside skin temperature of the pipe section. Another embodiment is to measure fluid flow within a confined conduit whereby the thermally conductive transfer medium is embedded within the conduit and allows for unimpeded and low heat measurements of fluids such as gasoline, diesel oil, liquid slurries, as well as gases such as air or nitrogen.

The thermal conduction means in the exemplary embodiment are clamps which mount to the pipe and form not only a mechanical connection between the meter and the pipe, but a thermal connection as well. The clamps are designed to transfer heat to and from the meter and the water within the pipe. The pipe may be any shape to contain the fluid and allow a thermal conduction means to the fluid within.

In the exemplary embodiment there is one upstream temperature reference clamp that contains an integrated temperature sensing element, such as a thermistor, thermocouple, or resistance temperature detector ("RTD"), which reads the current temperature of the pipe and fluid within. A second sensor clamp, mounted downstream from the reference, also contains an integrated temperature sensing element and a resistive heater which transfers heat energy into the pipe and the water within. This clamp performs the actual flow rate measurement.

Figures 2, 2A:
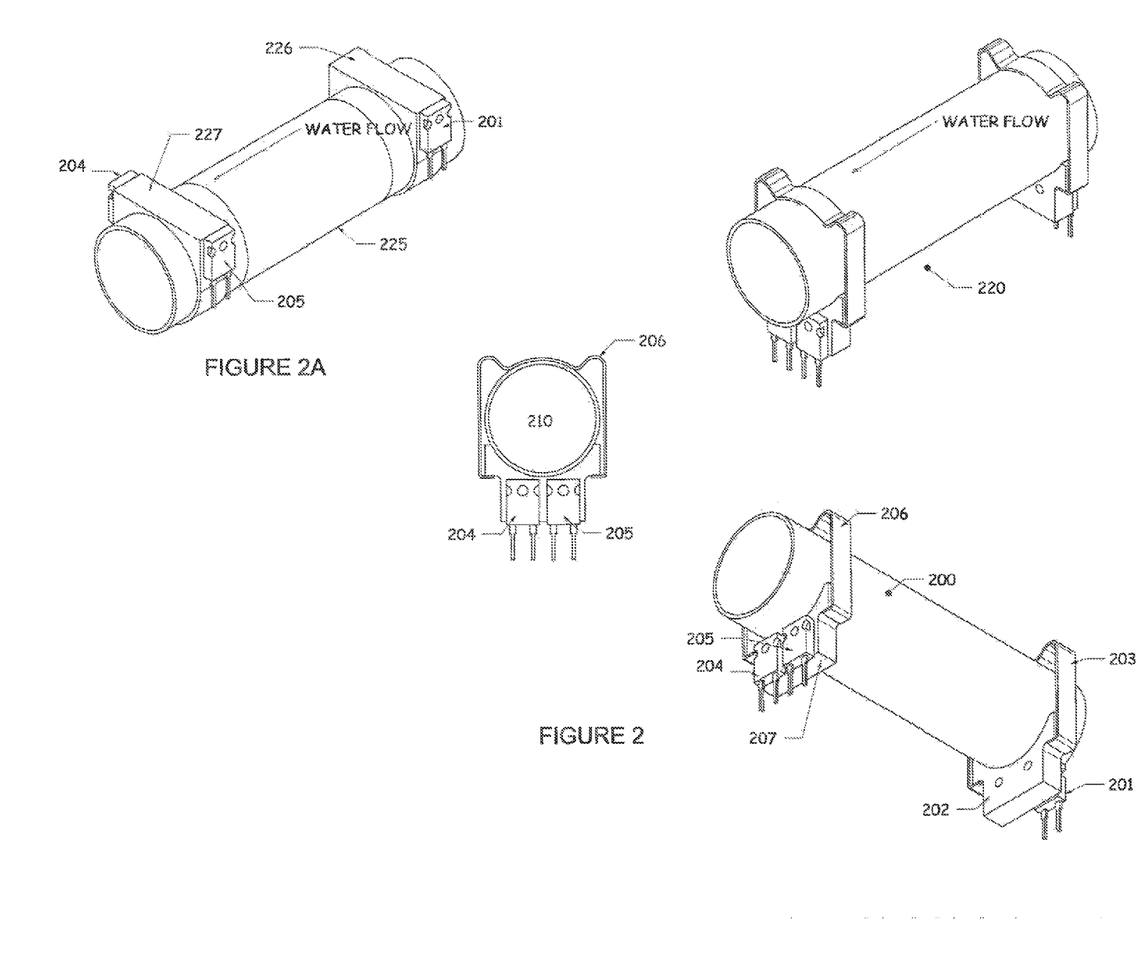
FIG. 2 contains three perspective views of the noninvasive sensors when clamped onto a metal pipe.
FIG. 2A is a perspective view of the sensors and heater when clamped onto a plastic pipe through in-molding thermal carriers.

Referring to FIG. 2, the clamps are comprised of a heat sink mount or "shoe" 202 and 207 which partially wraps around the outside diameter of the copper pipe 200, and are retained by spring cops 203 and 206 to keep them firmly pressed onto the pipe 200. The sensor/heat shoe 207 has mounting holes for both the thermistor 205 and the heater 204. The reference temperature shoe 202 has mounting holes for the reference thermistor 201. Since copper pipe 200 comes in various diameters, the shoes 202 and 207 may be configured in varying sizes and widths depending on the amount of surface area that is required to perform effective temperature coupling and heater loading.

While FIG. 2 depicts an exemplary embodiment of the electronic components 201, 204, and 205 with unconnected leads, it should be noted that either a single printed circuit board will be connected to these leads or additional wires will be added to these leads to form a remote control operation.

Additionally, FIG. 2A depicts a means to transfer heat through plastic pipe 225 by in-molding thermal carriers 226 and 227 and mounting the thermistors 201 and 205 and heater 204 directly to these thermal carriers 226 and 227. This method allows this invention to operate using non-thermally conductive materials such as plastic, Teflon, ABS, PVC, etc.

Figure 3:
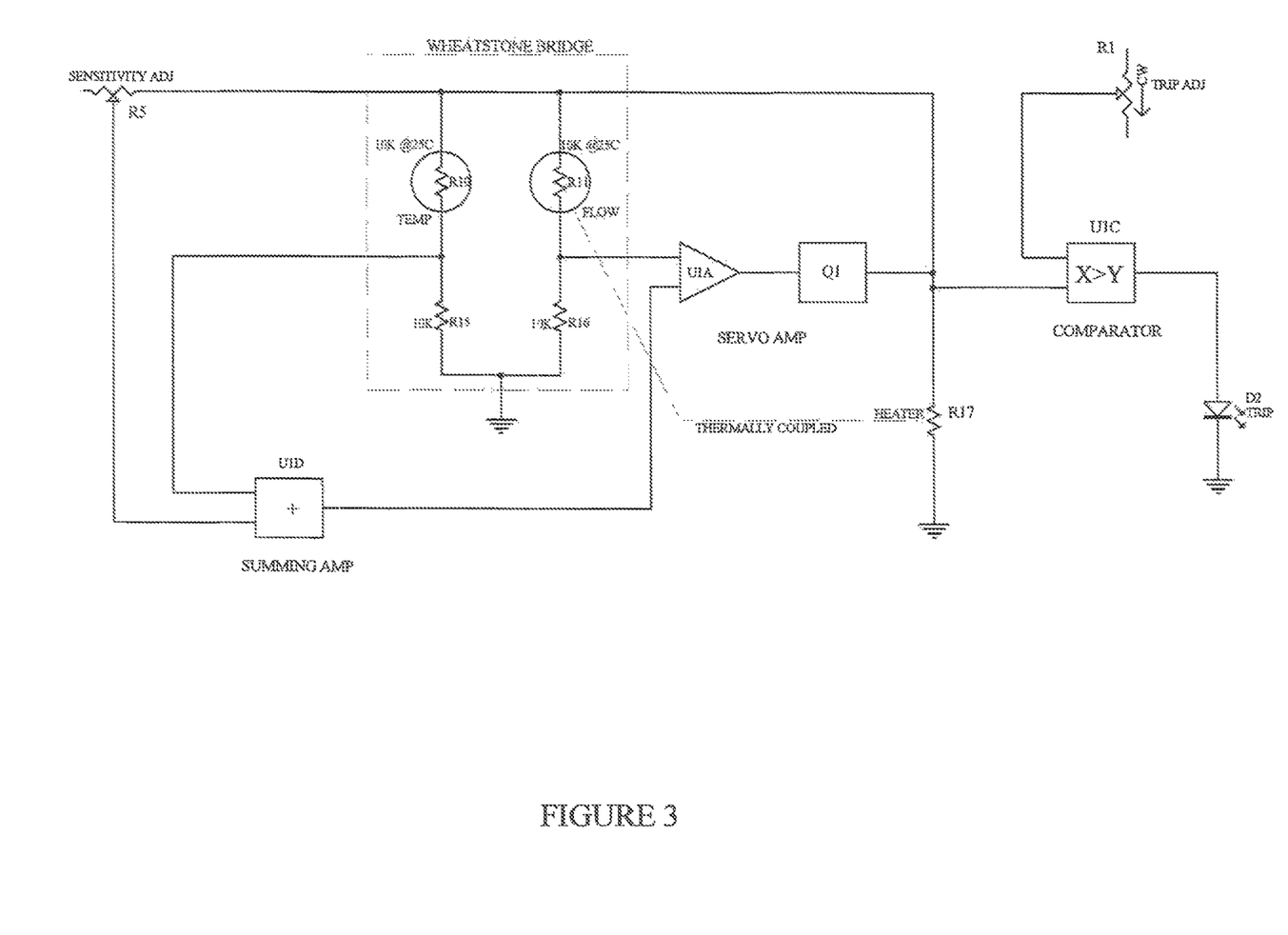
FIG. 3 is a basic electrical schematic diagram showing the implementation of a Wheatstone bridge used to sense the energy required to balance the bridge, and to energize an LED when the detected flow rate is above an adjustable level.

Referring to FIG. 3, as the heater R17 increases in temperature, the thermally coupled thermistor R11 senses the temperature change and adjusts the servo amp U1A to maintain the equilibrium of the Wheatstone Bridge circuit by modulating the power transistor Q1. The power transistor Q1 will either add or subtract power to the heater R17 to maintain the Wheatstone Bridge in balance. This system forms a closed loop feedback when the servo amp U1A reads the reference temperature thermistor R10, adds in the sensitivity bias voltage U1D, and then compares it to the current flow R11 temperature. This operation allows the reference thermistor R10 to adjust the circuit for any changes in incoming water temperature and allows the heater R17 to provide a constant temperature above the incoming water main as set by the sensitivity adjustment R5. Greater water flows require more heat to maintain this temperature difference and it is the amount of power consumed by the heater, to balance the bridge, which is read by the comparator U1C, to establish a flow trip threshold which is adjustable via resistor R1. If heater power increases above the preset trip threshold, the comparator U1C will activate and glow the TRIP LED D2 which, in other embodiments, may also be connected to a micro-controller to monitor flow and time.

Figure 4:
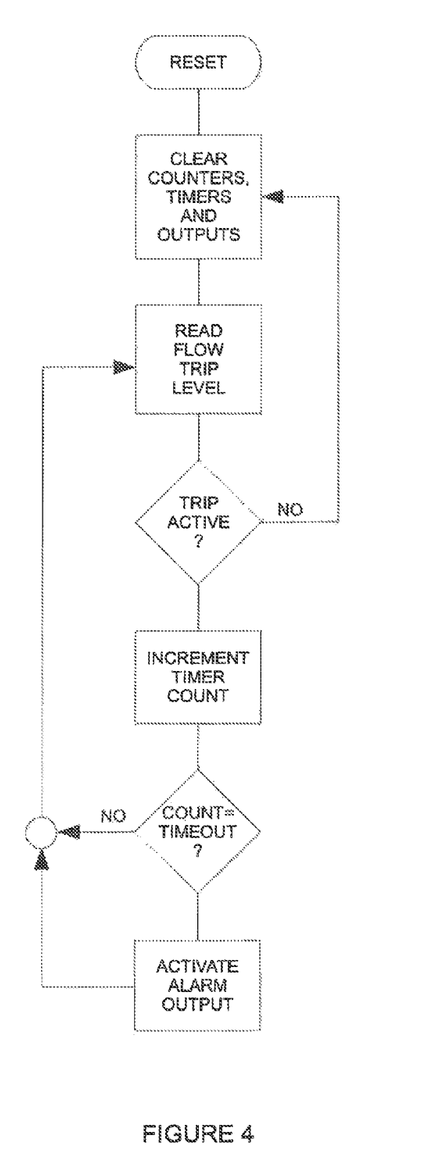
FIG. 4 is a flow diagram of an exemplary operation of the system of the present invention, and includes a sequence of operation when employing a microprocessor controller to monitor the trip level and timer settings.

FIG. 4 is a flowchart that describes an embodiment with a sequence of operations when employing a microprocessor controller to monitor the trip level and timer settings. When the trip level is exceeded, a counter is continuously incremented until it matches the timeout setting at which time the alarm output is activated. In this example, the alarm will automatically cancel once the trip value falls below the trip threshold, however some installations require latching the alarm on when tripped so it will remain active after the flow has been shut-off by employing an electric water shut-off valve 120 (not shown). The alarm output can be hard wired to existing commercial alarm panels. The alarm output signal may also drive a low power RF transmitter and pass its status via wireless signal.

Figure 5:
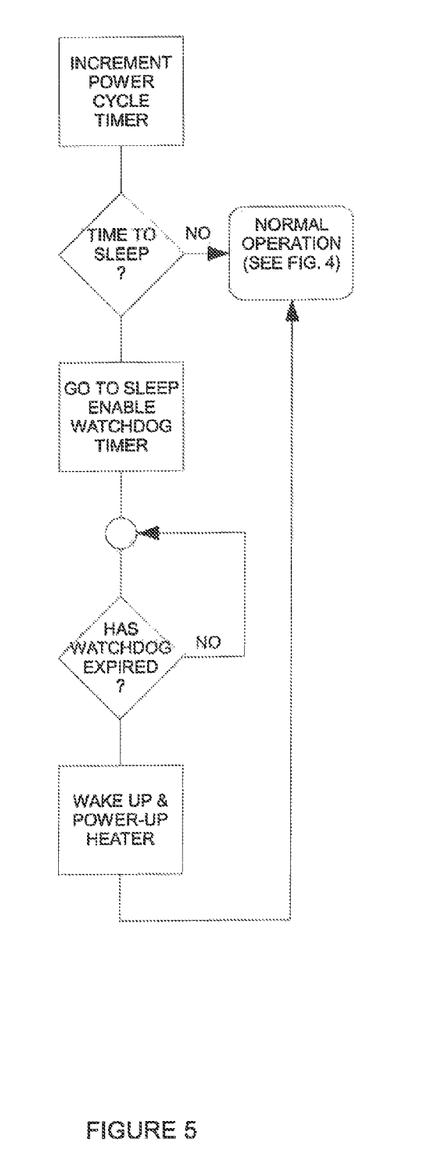
FIG. 5 is a flow diagram of an exemplary operation of the system of the present invention, and includes a sequence of operation when employing a microprocessor controller to cycle heater power to conserve energy and prevent excessive heating of the pipe section.

Referring to FIG. 5, the micro-controller may also be configured to cycle heater power to conserve energy and prevent excessive heating of the copper pipe section. Detection of the leak will still occur when the unit powers up and performs its leak tests over time. After the system wakes up and applies power to the heaters, the system will go into normal operation.

Figure 6:
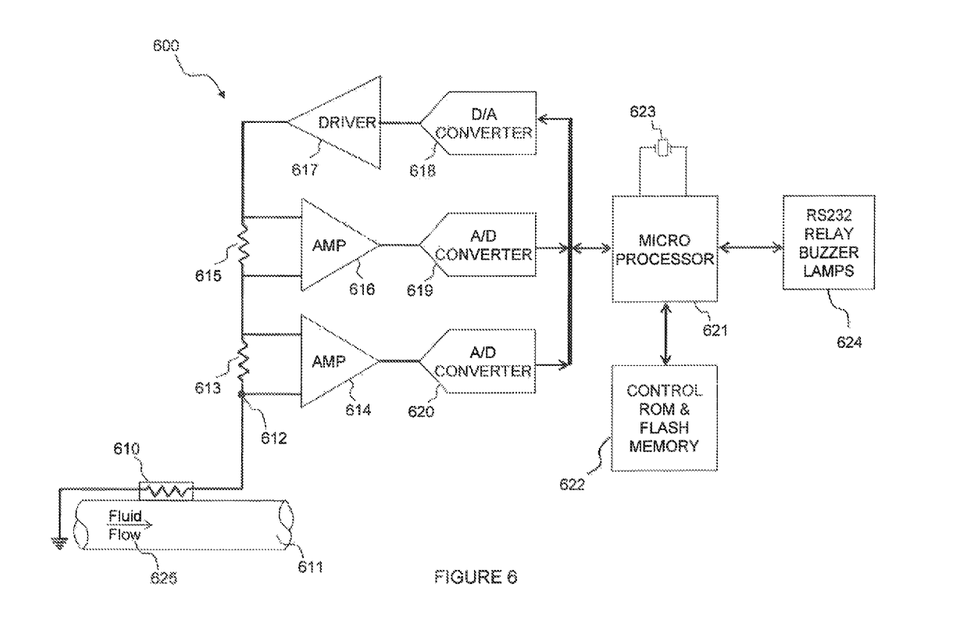
FIG. 6 is an electrical schematic showing the placement of the temperature sensors on the pipe and amplifiers configured to detect the flow signal.

FIG. 6 is an electrical schematic showing the placement of the flow sensor 610 clamped to a water pipe (conduit) 611, and amplifiers 614 and 616 configured to form a circuit to detect the variations in the resistance of the flow sensor 610 produced by the flow of fluid 625 through the conduit 611. The amplifiers 614 and 616 feed their signals into Analog to Digital Converters 619 and 620 to create a digital representation of the flow signals. The digital representations are then fed to a microprocessor 621 where they are analyzed to determine the flow rate by comparing the flow data to the data stored in the control ROM and flash memory 622. The microprocessor 621 will then perform various functions 624, such as energize a relay, illuminate an LED, or create an audible alarm, based on the measured flow rate as compared to the data stored in memory 622. The microprocessor 621 will also sense the amount of current flow through the flow sensor 610 and adjust it as necessary to maintain a constant electrical current through the flow sensor 610.

Figure 7:
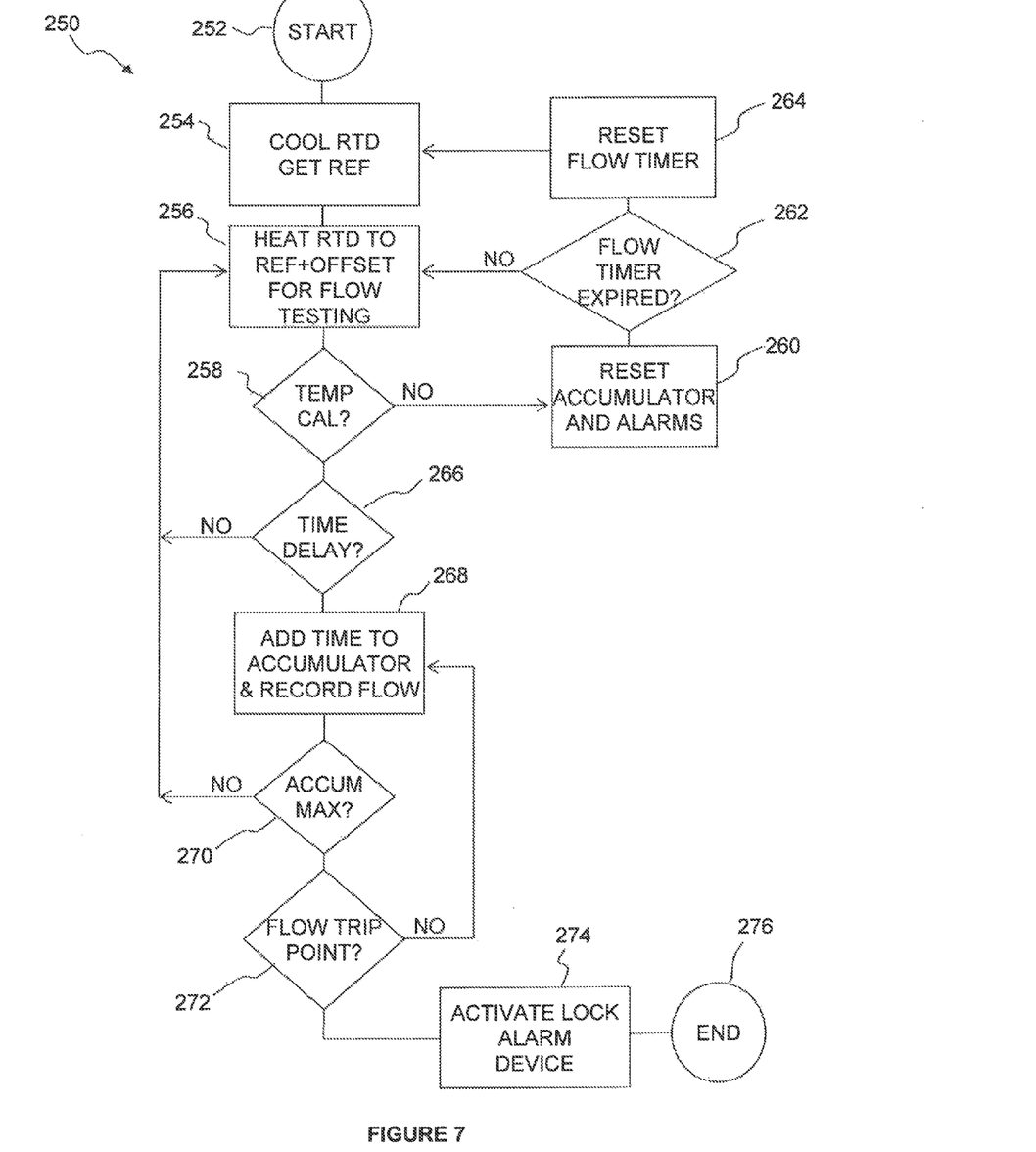
FIG. 7 is an exemplary operational flowchart showing the overall operation of the system of the present invention.

FIG. 7 is an exemplary operational flowchart showing the overall operation of the system of the present invention and is generally referred to as item 250. At the start of the operation 252, the sensor is deenergized to allow it to cool to ambient temperature and establish a baseline temperature for use in future calculations 254. The sensor is then heated to a reference temperature plus an offset temperature 256. If the temperature has not been calibrated 258, then the system will reset the accumulator and alarms 260 and to check to see if the flow timer has expired 262. If the flow timer has expired 262, the system will reset the flow timer 264 then restart the process 254. If the flow timer has not expired 262, the system will go to step 256 to heat the sensor 256.

If the temperature has been calibrated 258, then the system will check for the presence of a time delay 266. If the delay time value has not been reached, the system will return to step 256 to continue heating the RTD. If the delay time value has been reached 266, the system will add time to the accumulator and record flow 268. If the accumulator has not reached its maximum value 270, the system will return to step 256 where it will continue to heat the RTD. If the accumulator has reached its maximum value 270, the system will compare the calculated flow to the flow trip point 272. If the trip point has not been reached 272, the system will return to step 268 where it will add time to the accumulator and record flow. If the trip point has been reached 272, the system will activate functions such as an alarm, an indicator, and automatic valve closure 274. It should be appreciated by someone skilled in the art that many different functions may be controlled by the system and the functions listed above are not the exclusive functions of the system.

Figure 8:
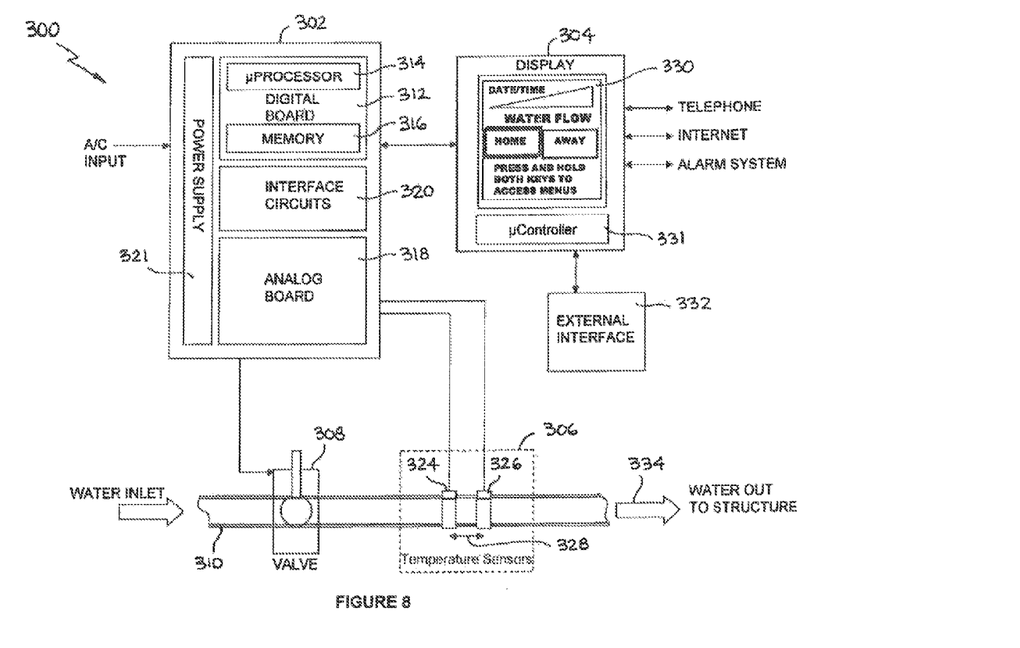
FIG. 8 is a block diagram of an alternative embodiment of the present invention showing dual temperature sensors coupled to analog and digital circuitry, a user interface display and a valve for interrupting fluid flow through a conduit.

FIG. 8 is a diagram of an alternative embodiment of the present invention and is generally designated 300. This diagram shows a clamp on temperature sensor package 306 which includes dual temperature sensors 324 and 326 separated by a known distance 328. The temperature sensor package 306 is coupled to a controller 302 having both analog 318 and digital 312 circuitry, and equipped with a user interface display 304 and a valve 308 for interrupting the flow of water through a pipe or conduit 310 should a leak be detected. The controller 302 has an internal power supply 321, a microprocessor 314 with memory 316, and interface circuits to control such things as the isolation valve 308, temperature sensor package 306, and the display unit 304. The display 304 utilizes a microcontroller 331 to control the user display panel 330, and external interfaces 332 such as telephone, Internet, and alarm.

An Alternative Embodiment

Figure 9:
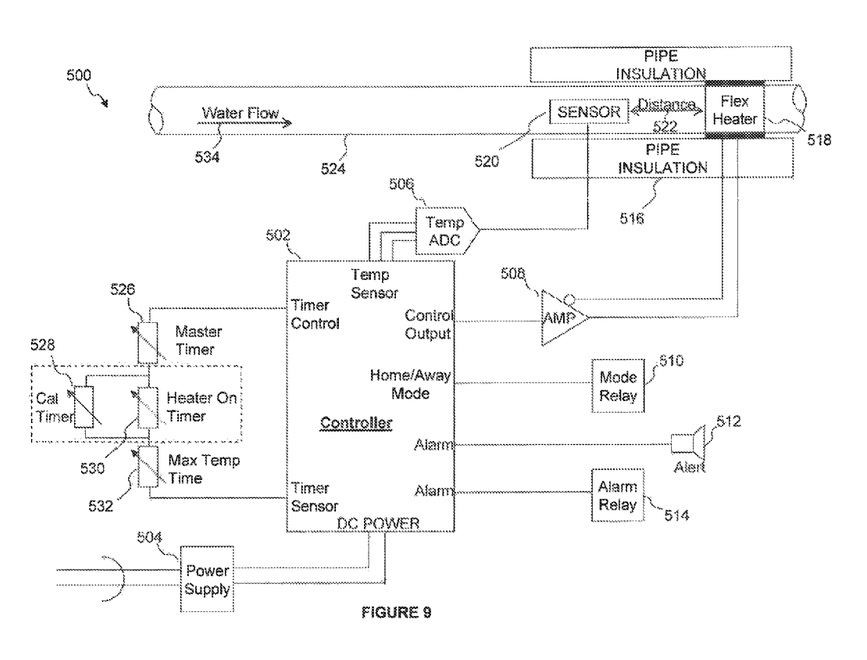
FIG. 9 is a block diagram of an alternative embodiment of the present invention showing a single sensor upstream from a heating element and having a central control unit with various inputs and outputs, alarm and mode control, and timer control. Additionally, the diagram illustrates the interface between the central control unit, the temperature sensor, and the heater.
Figure 10A:
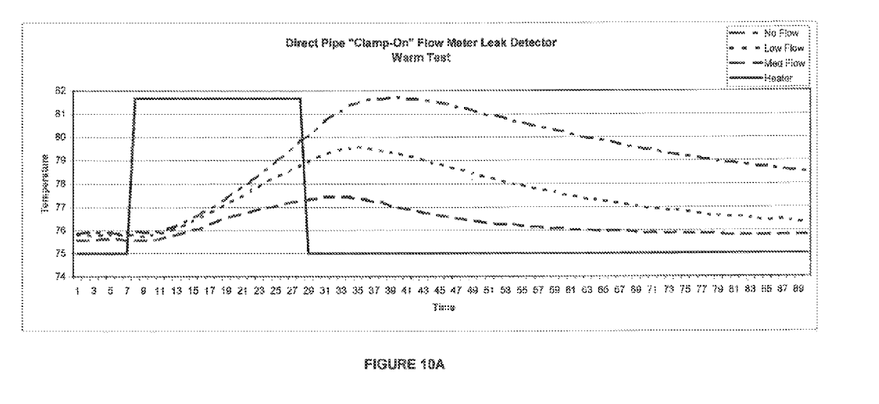
Figure 11A:
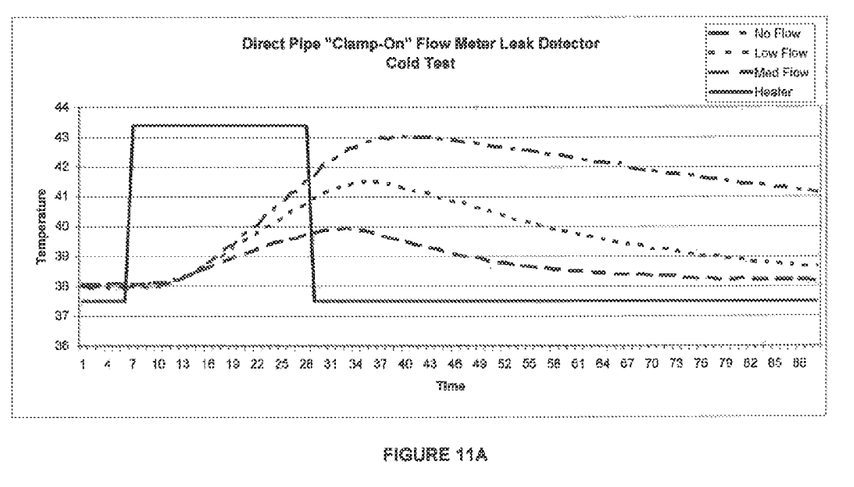

Now referring to FIG. 9, an alternative embodiment of the present invention is shown and is generally designated 500. This embodiment consists of one temperature sensor 520, such as a RID, thermistor, or thermocouple, clamped onto a pipe or conduit 524 and a heating element 518 mounted a distance 522 downstream from the temperature sensor 520. The temperature sensor 520 and heating element 518 are both wrapped or covered with an insulation material 516 thereby increasing the accuracy and sensitivity of the system.

This alternative embodiment uses heat conduction, propagation, and time to determine if there is liquid flow within an enclosed metallic conduit 524. FIGS. 10A, 10B, 11A, and 11B consist of graphs and the associated data points of temperature response to a known amount of heat energy added to a conduit having a no flow, low flow, and medium flow condition. The graphs and data points are for a warm test and cold test respectively. Two elements are required to electrically perform this function. One is a temperature sensor 520, either analog or digital, and the other is a resistive heater band 518 which wraps around the outside diameter of the conduit 524. It should be noted that the heater 518 and sensor 520 are separated by a short distance 522, such as 1" to 3", in order to create more average heating across the conduit 524 cross section, and also allow the internal flowing liquid 534 to carry away the conducted heat via convection cooling of the conduit 524 itself.

In normal operation, this embodiment works in an intermittent operation. After a calibrated time has elapsed, the heater 518 becomes energized, which forces heat energy into the conduit 524. The controller 502 would read the temperature sensor 520 just prior to heater 518 activation, and stored that value for further calculations. Conducted heat from the metallic conduit 524 will readily propagate from the center of the heat source 518 and outward eventually reaching the temperature sensor 520. The amount of time it takes for the heat to propagate to the temperature sensor 520 is recorded in the controller 502 and is a direct function of the liquid flow 534 within the conduit 524. Long propagation times reflect large effective flow rates.

The heater power is removed after a predetermined "no-flow" condition timer expires. The controller 502 will continue to read the temperature sensor 520 to continually analyze the heat propagation and lock onto a value that represents the peak temperature attained. This value is also a direct function of the liquid flow 534 within the conduit 524. Higher peak temperatures represent low effective flow rates, as the heater 518 is simply creating a no flow "pocket" of liquid, with little to no convective forces to carry away the applied heat energy.

Finally, after a predetermined amount of time has elapsed, the controller 502 acquires one final reading from the temperature sensor 520 and compares it to the previously saved value before the heater 518 was activated. The ratio of the before and after temperature readings is also a direct function of the liquid flow 534 within the conduit 524. The closer the two values are, the greater the effective flow rate is within the conduit 524 as the flowing liquid 534 is restoring the ambient fluid temperature to nullify the effects of the previously added heat energy.

All of the calculated temperature and time variables are scored within an algorithm that normalizes the effective flow rate with respect to ambient temperature and conduit/heater 524/518 thermal conductivity. The calculated score determines the liquid flow 534 rate, then the controller 502 records that rate, powers down for a short period of time as determined by the Master Time value 526, and allows the heater 518 and temperature sensor 520 to return to ambient conditions through natural convection.

As the system continues to move through heating and cooling cycles, the running status is accumulated. If the flow rate over all the cycles has not provided a single "no-flow" score, the system will enter an alarm state where it will either activate a relay 514, create an audible alert 512, or do both. The alarm may be cancelled by stopping the fluid flow or by switching to another mode of operation 510, either HOME or AWAY, which effectively resets all timers and scoring status results.

The heater 518 and temperature sensor 520 must be properly affixed to the conduit 524 to ensure consistent results over a long period of time measured in years. The heater 518 is a flexible silicone band which can wrap around the conduit 524 and be held in place with a self adhesive vulcanizing wrapping tape specifically designed to seal out moisture and provide continuous pressure on the heater 518 ensuring optimal thermal conductivity over time. It is to be appreciated by someone skilled in the art that many heater 518 designs exist that will satisfy the requirements of the system. The temperature sensor 520 also requires the same treatment during installation to ensure that the conduit 524 temperature is properly reported. It is also imperative that the entire heater/sensor 518/520 section, and a few inches beyond, be enclosed in thermal insulation 516. This prevents ambient or environmental aft currents from affecting the calibrated flow readings by heating or cooling effects that are not the direct result of the fluid flow 534 within the conduit 524.

Intermittent operation of the heater 518 is required to provide the extended "no-flow" time period with an opportunity equilibrate with ambient conditions. Otherwise, the heater 518 and temperature sensor 520 would create a localized "hot water heater" within the test section of the conduit 524. Therefore, this device may not be used to measure flow rate or flow total as do other technologies, such as Thermal Mass Flow Meters. While this system is currently described to operate through a dosed section of copper tubing/pipe 524, it may also operate through plastic conduit provided that the test section has in-molded metal plates or "shoes" within. The heater 518 and temperature sensor 520 requires direct thermal conduction of the fluid within in order to perform the same operation of an all-metal design.

An AC/DC power supply 504 may be used since the heater 518 requires significant energy output (>12 Watts) to perform its tests accurately and reliably. Alarm panel interfacing may also be expanded to include both wired and/or wireless operation for command/control facilities.

Installation and Calibration

This alternative embodiment of the present invention requires about 8"-10" of clean copper pipe 524 to properly assemble the test section. The section of water pipe 524 selected should pass all incoming supply to the entire structure and should not be located outside where protecting the heater 518 and temperature sensor 520 elements would be impossible.

Once the heater 518 and temperature sensor 520 have been properly installed and the wiring and power have been completed, the device must be calibrated to the particular installation. Before activating the calibration function, all water flow in the test section must be halted.

The calibration function can be activated by an on-board switch, or wireless command, or a unique mode selection. During calibration, the unit will activate the heater 518. When the temperature sensor 520 records a temperature increase of 4° F.-10° F., the time which passes during this test is recorded by the controller 502 and stored for all future heater timing variables. Calibration finishes automatically and the system will be able to alert the installer if there is a problem or start performing normal operations if all is well.

This invention is a fluid flow meter with many applications and embodiments incorporating a unique method of flow measurement utilizing noninvasive thermal anemometry. The use of a Wheatstone Bridge greatly increases the system sensitivity and accuracy allowing it to be used in many applications.

While there have been shown what are presently considered to be preferred embodiments of the present invention, it will be apparent to those skilled in the art that various changes and modifications can be made herein without departing from the scope and spirit of the invention.

The invention claimed is:

1. A non-invasive thermal dispersion flow meter with chronometric monitor, comprising:
    a temperature sensor;
    a heating element located a distance downstream from said temperature sensor, wherein heat energy created by said heating element propagates upstream towards said temperature sensor; and
    a controller connected to said temperature sensor and said heating element; and
    wherein said temperature sensor senses said heat energy created by said heating element and said controller calculates a propagation time of said heat energy from said heating element to said temperature sensor, said propagation time is a direct function of a fluid flow rate.

2. The non-invasive thermal dispersion flow meter with chronometric monitor of claim 1, further comprising:
    an insulation covering said temperature sensor and said heating element.

3. The non-invasive thermal dispersion flow meter with chronometric monitor of claim 2, wherein said controller comprises:
    a timer controller;
    a timer sensor;
    a temperature sensor input, said temperature sensor connected to said temperature sensor input; and
    a heater control output, said heating element connected to said heater control output.

4. A fluid leak detector for detecting leakage in a pressurized fluid system having a closed fluid conduit having an upstream portion and a downstream portion where fluid flows from the upstream portion toward the downstream portion, the fluid leak detector having a means for detecting the flow of fluid through said conduit comprising:
    a temperature sensor in thermal communication with the outside of said upstream portion of said conduit and capable of sensing heat energy of said fluid within said conduit;
    a heating element in thermal communication with the outside of said downstream portion of said conduit, wherein heat energy created by said heating element propagates upstream towards said temperature sensor; and
    a means for calculating a propagation time of said heat energy propagating upstream from said heating element to said temperature sensor, wherein said propagation time is a direct function of fluid flow rate.

5. The fluid leak detector of claim 4, wherein said means for calculating a propagation time comprises:
    a controller.

6. The fluid leak detector of claim 5, further comprises:
    an insulation covering said temperature sensor and said heating element.

7. A method for detecting leakage in a pressurized fluid system having a closed fluid conduit having an upstream portion and a downstream portion where fluid flows from the upstream portion toward the downstream portion, comprising the steps of:
    providing a fluid leak detector having a means for detecting the flow of fluid through said conduit, wherein said means for detecting the flow of fluid through said conduit comprises:
    a temperature sensor in thermal communication with the outside of said upstream portion of said conduit and capable of sensing heat energy of said fluid within said conduit;
    a heating element in thermal communication with the outside of said downstream portion of said conduit, wherein heat energy created by said heating element propagates upstream towards said temperature sensor; and
    a means for calculating a propagation time of said heat energy propagating upstream from said heating element to said temperature.

8. The method for detecting leakage in a pressurized fluid system of claim 7, wherein said means for calculating a propagation time comprises a controller connected to said temperature sensor and said heating element.

9. The method for detecting leakage in a pressure fluid system of claim 8, further comprising the steps of:
    (1) determining an ambient temperature value;
    (2) determining a propagation time of said heat energy;
    (3) determining a peak temperature sensor value;
    (4) determining a temperature ratio;
    (5) determining a flow rate score;
    (6) repeating steps 1 through 5 for a predetermined number of running cycles determined by a Total Running Cycle value; and
    (7) analyzing said fluid flow score for each running cycle for a no-flow fluid flow score, wherein the absence of a no-flow fluid flow score will trigger an alarm state.

10. The method for detecting leakage in a pressure fluid system of claim 9, wherein said step of determining an ambient temperature value comprises the steps of:
    measuring said ambient temperature of said fluid with said temperature sensor; and
    recording said ambient temperature.

11. The method for detecting leakage in a pressure fluid system of claim 10, wherein said step of determining a propagation time of said heat energy comprises the steps of:
- energizing said heating element thereby introducing heat energy into said fluid and propagating said heat energy upstream through said downstream flowing fluid;
- sensing said heat energy propagating upstream with said temperature sensor;
- calculating said propagation time of said heat energy; and
- recording said propagation time, wherein said propagation time is a direct function of a fluid flow rate of said fluid.

12. The method for detecting leakage in a pressure fluid system of claim 11, wherein said step of determining a peak temperature sensor value comprises the steps of:
- de-energizing said heating element after a no-flow condition timer expires;
- reading said temperature sensor to analyze said heat propagation; and
- recording a peak temperature sensor value.

13. The method for detecting leakage in a pressure fluid system of claim 12, wherein said step of determining a temperature ratio comprises the steps of:
- measuring a final temperature of said fluid with said temperature sensor after a cool down period has expired; and
- calculating said temperature ratio between said ambient temperature and said final temperature, wherein said temperature ratio is a direct function of the fluid flow rate within the conduit.

14. The method for detecting leakage in a pressure fluid system of claim 13, wherein said step of determining a flow rate score comprises the steps of:
- calculating said flow rate score based on said ambient temperature, propagation time, peak temperature, and ratio;
- recording said flow rate score;
- powering down said controller for a time period determined by a Master Time value; and
- cooling said fluid and said conduit.

* * * * *